United States Patent
Schumacher (10) Patent No.: US 10,281,034 B2
(45) Date of Patent: May 7, 2019

(54) HYDROSTATIC BREAKING CONCEPT (71) Applicant: Danfoss Power Solutions GmbH & Co OHG, Neumünster (DE)

(72) Inventor: Andreas Schumacher, Kellinghusen (DE)

(73) Assignee: Danfoss Power Solutions GmbH & Co. OHG, Neumunster (DE)

( * ) Notice: Subject to any disclaimer, the term of this patent is extended or adjusted under 35 U.S.C. 154(b) by 539 days.

(21) Appl. No.: 14/919,832

(22) Filed: Oct. 22, 2015

(65) Prior Publication Data
US 2016/0116060 A1 Apr. 28, 2016

(30) Foreign Application Priority Data
Oct. 23, 2014 (DE) .................. 10 2014 221 594

(51) Int. Cl.
*F16H 61/421* (2010.01)
*F16H 61/431* (2010.01)
(Continued)

(52) U.S. Cl.
CPC ......... *F16H 61/4157* (2013.01); *F16H 39/02* (2013.01); *F16H 61/4017* (2013.01);
(Continued)

(58) Field of Classification Search
CPC ...... F16H 39/02; F16H 61/4017; F16H 61/61; F16H 61/421; F16H 61/431
(Continued)

(56) References Cited

U.S. PATENT DOCUMENTS 3,846,982 A 10/1974 Rometsch et al.
6,837,047 B2 1/2005 Dong et al.
(Continued)

FOREIGN PATENT DOCUMENTS

CN 101094999 A 12/2007
CN 101156007 A 4/2008
(Continued)

*Primary Examiner* — Nathaniel E Wiehe
*Assistant Examiner* — Daniel S Collins
(74) *Attorney, Agent, or Firm* — McCormick, Paulding & Huber LLP (57) ABSTRACT

Hydrostatic transmission and method for decelerating a hydrostatic transmission with a closed hydraulic fluid circuit, in which a hydraulic pump drivable by a drive engine and a hydraulic motor are arranged and connected fluidly to one another through two working lines. Alternately depending on the operational mode and on the conveying direction of the hydraulic pump, one working line is the low pressure line and the other one is the high pressure line. The hydraulic pump as well as the hydraulic motor are adjustable in their respective displacement volumes by means of a control unit. The hydraulic motor comprises a housing in which a hydrostatic drive mechanism having an inlet and an outlet is arranged. In a connecting line connecting the outlet and the inlet a pressure control valve is arranged, which can be flown through in direction to the inlet. The pressure control valve opens if the high pressure present at the outlet exceeds a predetermined pressure limit of the pressure relief valve. During the coasting operation of the hydrostatic transmission the displacement of the hydraulic pump and/or of the hydraulic motor are adjustable by means of the control unit in function of the speed of the drive motor or of the speed of the hydraulic pump.

20 Claims, 4 Drawing Sheets

(51) Int. Cl.
    *F16H 61/4157*     (2010.01)
    *F16H 39/02*     (2006.01)
    *F16H 61/4017*     (2010.01)
    *F16H 59/68*     (2006.01)

(52) U.S. Cl.
    CPC ......... *F16H 61/421* (2013.01); *F16H 61/431* (2013.01); *F16H 2059/6869* (2013.01); *F16H 2059/6876* (2013.01)

(58) Field of Classification Search
    USPC .......................................................... 60/490
    See application file for complete search history.

(56) References Cited

U.S. PATENT DOCUMENTS

| | | | |
|---|---|---|---|
| 2004/0006981 A1 | 1/2004 | Dong et al. | |
| 2014/0075930 A1* | 3/2014 | Maiyur | F04B 13/00 60/327 |
| 2014/0162738 A1* | 6/2014 | Richter | A01F 29/14 460/3 |
| 2014/0216024 A1* | 8/2014 | Krug-Kussius | F15B 13/026 60/459 |

FOREIGN PATENT DOCUMENTS

| | | |
|---|---|---|
| DE | 102006059734 A1 | 6/2007 |
| DE | 102010045541 A1 | 3/2012 |
| EP | 1930594 A1 | 6/2008 |
| EP | 2667059 A1 | 11/2013 |
| JP | 2002013636 A | 1/2002 |

\* cited by examiner

HYDROSTATIC BREAKING CONCEPT

CROSS REFERENCE TO RELATED APPLICATION

Applicant hereby claims foreign priority benefits under U.S.C. § 119 from German Patent Application No. DE102014221594.3 filed on Oct. 23, 2014, the content of which is incorporated by reference herein.

TECHNICAL FIELD

The invention relates to the use of driving mechanisms of hydraulic machines being adjustable in its displacement and being arranged in a hydrostatic transmission comprising a closed hydraulic fluid circuit. The invention further relates to a method for operating driving mechanisms within hydraulic machines. In particular, the application relates to a device and a method for decelerating a hydrostatic transmission, respectively, a hydraulic motor arranged therein. In driving mode, i.e. in working mode, in which the hydraulic motor has to provide work, the hydraulic motor is driven by a hydraulic pump adjustable in its displacement, whereas the hydraulic pump is driven by a drive engine. Preferably, the drive engine is a combustion motor, more preferably a diesel engine. However, the inventive idea extends to electric motors as well as to other work machines suitable for driving the hydraulic pump.

BACKGROUND

In working machines, in particular for agriculture and forestry as well as for road construction machines or floor conveyor vehicles, hydrostatic drives are used, preferably due to the high forces being transmittable by them and due to their robustness as well due to their low-wearness. Here, hydrostatic drives are used for propel drives as well as for propelling working devices. Preferably, hydrostatic drive mechanisms being adjustable in its displacement are used hereby in hydraulic pumps as well as in hydraulic motors. More preferably, hydrostatic devices are used, which admit a forward as well as a backward mode, a so-called reversed mode for the hydrostatic drive. For driving the hydrostatic transmission, drive engines acts mechanically on a hydraulic pump and drives the same rotatable. Preferably, the hydraulic pump is adjustable in its conveying volume such that a hydraulic fluid flow rate towards the hydraulic motor is adjustable in its amount. In order that a predetermined maximum pressure in the hydraulic lines respectively in the working lines connecting for instance the hydraulic motor with the hydraulic pump is not exceeded, pressure relieve valves are provided in branch lines splitting off from the working lines. By means of these a partial flow of hydraulic fluid can be released. With these pressure relieve valves arranged in the branch lines pressure relieve valves damage on the hydrostatic drive can be prevented in the drive mode as well as in the coasting mode, if the high pressure exceeds a maximum value.

In coasting mode, in which the hydraulic motor acts as a hydraulic pump, kinetic energy of the hydraulic transmission is transmitted, for instance, via the traction wheels of a mobile working machine to the drive mechanism of the hydraulic motor. The so driven driving mechanism of the hydraulic motor conveys, depending on the adjusted displacement (now a conveying volume), hydraulic fluid with high pressure to the hydraulic pump, which is thereby driven hydraulically. The hydraulic pump supports itself mechanically on the drive motor imposing a resistance against this driving force being denominated as well as braking—coasting—or drag moment of the driving engine. If the high pressure generated in the coasting mode by the hydraulic motor is higher than an opening pressure of a pressure relief valve adapted to the drag moment of the drive engine, a partial flow rate of the hydraulic fluid under high pressure is released over the pressure relief valves and bypasses via split lines located at the drive mechanism, the hydraulic pump. Therewith, kinetic energy of the hydrostatic drive can be transformed into heat by means of the pressure relief valve.

DE 10 2006 059 734 A1 shows such a hydrostatic drive and a method for decelerating a hydrostatic drive. In this hydrostatic drive to each working line a pressure relief valve is allocated, which releases the high pressure towards the other working line with low pressure if in the corresponding working line a high pressure is present that exceeds a predetermined value. For being usable for reversible drives also, the system of DE 10 2006 059 734 A1 shows mirror-inverted arranged pressure relief valves, each of which can be bypassed by a bypass line, whereby in each bypass line a check valve is arranged. For this, each check valve opens the bypass lines in the opposite flow direction of the pressure relief valve, to which it is allocated. The system in the aforementioned document is arranged preferably in the hydraulic pump. Due to this, the supply lines from the hydraulic motor to the pressure relief valves are very long and, further, dynamic pressures can occur in the long high pressure lines. Simultaneously during a coasting mode, in the working lines conveying low pressure, lack of hydraulic fluid can arise, which ends up in a so-called low pressure drop. Such low pressure drops occur for instance if the displacement of the hydraulic motor in coasting mode is set corresponding to the actuation/operator force on a brake actuator, whereas the hydraulic pump is displaced fixedly on a brake conveying volume. If the brake actuator is actuated stronger, the conveying volume of the hydraulic motor is increased, what possibly leads to a situation, in which the conveying volume of the hydraulic motor is bigger than the brake volume set at the hydraulic pump. In this situation the hydraulic motor does not receive the needed amount of hydraulic fluid. A low pressure drop occurs as the actual flow rate from the hydraulic pump to the hydraulic is lower than the requested one. In practice such low pressure drops are often compensated by a hydraulic fluid pressure accumulator connected to the low pressure line.

SUMMARY

Therefore, it is an object of the invention to provide a device and a system for hydrostatic deceleration/braking of hydrostatic drives, in which dynamic pressures and low pressure drops in the working lines are prevented, and whereby the system provide a quick reaction capability if overpressures occurs. At the same time the system should be robust as well as cost effective in its manufacturing. A further object of the invention is to provide a compact system, which, if applicable, can be mounted in already existing systems without changing their basic structure.

The inventive object is solved by a hydrostatic drive according to claim 1, whereas subclaims are directed to preferred embodiments of the inventive hydrostatic transmission. The object is also solved by a method given in the parallel independent claim and with which the inventive hydrostatic transmission can be controlled. The respective subclaims are directed to preferred embodiments of the given subject matter.

The inventive hydrostatic transmission comprises a closed hydraulic fluid circuit, in which a hydraulic pump drivable by a drive engine and a hydraulic motor are arranged. The hydrostatic drive mechanisms are connected to each other via two working lines, whereas alternately, depending on the operating mode and the conveying direction of the hydraulic pump, one of the two working lines is a low pressure line and the other one is a high pressure line. The hydraulic pump as well as the hydraulic motor is adjustable in its conveying volume by a control unit, whereby the hydraulic fluid flow rate passing through the same is adjustable. The hydraulic pump as well as the hydraulic motor each shows a hydrostatic driving mechanism having an inlet and an outlet for hydraulic fluid. Depending on the operational direction, for instance a forward mode or a backward mode, the inlet of the driving mechanism changes with the outlet depending on the conveying direction of the closed hydraulic circuit, within which the hydraulic pump and the hydraulic motor are operated.

Consequently, in drive mode of the driving mechanism of the hydraulic motor high pressure is present at the inlet, whereas the pressure fluid released by the drive mechanism flows off under low pressure from the outlet to the working line running to the hydraulic pump. In coasting mode only the pressure relations at the inlet and the outlet are changing, as the hydraulic motor, it means its driving mechanism, is driven in coasting mode by the driving shaft connected to the driving mechanism. In such a coasting mode the driving mechanism arranged in the hydraulic motor acts as a hydraulic pump, whereby hydraulic fluid under low pressure is sucked in at the inlet of the hydraulic motor drive mechanism and is pumped out at the outlet with high pressure. In order that the high pressure in the working line at the outlet does not exceed a predetermined pressure limit, a connection line connecting directly the outlet with the inlet is arranged, guiding pressure fluid during coasting operation in direction to the inlet side. For this, in the connection line at least one pressure relief valve is arranged, which can be passed through in flow direction from the outlet to the inlet. The pressure relief valve is in its closed position as long as the pressure at the outlet does not exceed a predetermined, respectively a given pressure limit. When exceeding the predetermined pressure limit, the pressure relief valve opens and a partial flow rate of the hydraulic fluid can flow over the connection line on a short, preferably very short way to the inlet of the driving mechanism of the hydraulic motor. As commonly known in the art, hydrostatic energy is transformed into heat during the through flow of hydraulic fluid through a pressure relief valve, whereby kinetic energy to be decelerated can be released in form of heat, for example to the environment.

The partial flow rate, which has to be deflected, according to the invention, if the predetermined pressure limit is exceeded, over the connection line and the pressure relief valve arranged therein results according to the invention from the conveying volume flow rate of the driving mechanism of the hydraulic motor in coasting mode minus the hydraulic fluid flow, which can be accepted by the driving mechanism of the hydraulic pump. According to the invention, the conveying volume flow rate through the hydraulic pump, that means through its driving mechanism, is adjusted according to the operational situation, such that the drive engine of the hydraulic pump or the hydraulic pump itself is held at its rotational speed limit for the coasting operation or slightly below. This, according to the invention, is controlled by a control unit receiving as an input signal for example the rotational speed of the drive engine, the rotational speed of the driving shaft of the hydraulic pump or the rotational speed of the hydraulic pump for determining the conveying volume flow rate of the hydraulic pump. According to this signal, the control unit determines if the conveying volume of the driving mechanism of the hydraulic pump should be increased, decreased or maintained. If the driving mechanism of the hydraulic motor conveys more hydraulic fluid as the hydraulic pump can absorb at maximum conveying volume and at maximum admissible coasting rotational speed, the excessive hydraulic fluid flow rate is released under dissipation of heat via the connection line and the pressure relief valve arranged therein. The released hydraulic flow rate is conducted further on to that working line being the low pressure line.

The rotational speed limit of the drive mechanism of the hydraulic pump for the coasting mode is usually given by the manufacturer of the apparatus and corresponds to the rotational speed at which the apparatus is not damaged in repeated long term (coasting) operations. Frequently, this maximum drag rotational speed is higher than the maximum rotational speed in drive mode, as the loads in coasting mode within the drive engine are lower than in the drive operation.

If the operation of the hydrostatic transmission is foreseen for both rotational directions of the output shaft of the hydraulic motor, the inventive arrangement and control can be used for both conveying directions of the closed circuit if two pressure relief valves are arranged in the connection line, each of which can be passed through in opposite direction and each is bypassed by a separate bypass line. In each of the bypass lines a check valve is arranged, which can be opened in opposite direction to the corresponding pressure relief valve, to which the bypass line i.e. the check valve is allocated. By such an arrangement it is achieved that only one connection line between the outlet and the inlet of the driving mechanism of a hydraulic motor is needed, whereas the corresponding bypass line opens by means of a check valve the "blocking" pressure relief valve, which do not open in the direction of the actual flow, thereby enabling the through flow trough the connection line.

By means of the preferred arrangement of the pressure relief valve within or located directly at the housing of the hydraulic motor, long lines, in which dynamic pressures or low pressure drops can occur, can be prevented effectively. Therewith, it can be prevented further that hydraulic fluid pressure accumulators, as common in the art, have to be provided to compensate eventual arising low pressure drops, for example, if the conveying volume flow rate of the hydraulic motor exceeds the maximum drag volume flow rate of the hydraulic pump. The shorter the connection lines between the outlet and the inlet can be designed, the more effective these low pressure drops can be prevented. Further, the inventive arrangement of a connection line in close proximity of the driving mechanism of the hydraulic motor with at least one pressure relief valve arranged therein showing a through flow direction in conveying direction, can react the quicker on changing operational conditions in a coasting operation the shorter the connection line section between the outlet and the pressure relief valve is designed. Thereby, not only a stiff since also an exact controllable hydrostatic transmission with short reaction times for the coasting mode is provided. In particular with short connection line sections a robust and also—due to the low number of parts—cost effective system is achieved, which, additionally, works extremely reliable. With the short line connection sections from the outlet to the pressure relief valve(s) and, preferably, also from the pressure relief valve(s) to the inlet of the drive mechanism a sensitive, quick reacting device is provided holding the pressure in the low pressure working line essentially constant.

As the pressure relief valves are arranged preferably in the close proximity at the outlet of the driving mechanism of the hydraulic motor, the pressure present in the hydraulic lines running from the hydraulic motor to the hydraulic pump can be set precisely and in a reliable manner to a preferably adjustable constant maximum value, i.e. the pressure limit. Dynamic pressures in the hydraulic lines, which occur in the hydraulic lines of the state of the art, can thereby also be prevented. Further, the hydraulic fluid flow rate conducted according to the invention over the pressure relief valves can be released in comparison to the state of the art more effective, as no dynamic pressures caused by long line sections have to be considered. In other words the coasting capability of the drive engines of the state of the art cannot be used in an optimum manner for decelerating a hydrostatic transmission, as, for example, the drag volume/the displacement of the hydraulic pump during coasting operation is not readjusted. Additionally, the drive engine according to the invention can be controlled more exact as the pressure limit being adjustable at the pressure relief valves corresponds to the maximum pressure within the driving mechanism of the hydraulic pump. This is valid even more, the closer the pressure relief valves are arranged to the driving mechanism of the hydraulic motor. This is a preferred embodiment of the invention.

Furthermore, by controlling the hydraulic fluid flow, which is guided to the hydraulic pump and/or by controlling the limit rotational speed of the drive engine, respectively of the hydraulic pump, "parasitic" consumer powers can be used in the coasting operation for decelerating the hydrostatic transmission. Hence, rotational speed reducing (auxillary-)consumers show an advantageous effect as the rotational speed of the drive engine or the hydraulic pump of the drive engine is, nevertheless, hold on or close to the maximum admissible rotational speed limit for the coasting mode. This means that the conveying volume of the hydraulic motor and the hydraulic pump are adapted continuously such that the maximum admissible drag rotational speed of the hydrostatic transmission is hold constant during the whole deceleration operation. At the same time, it is achieved that only a minimum necessary amount of kinetic energy has to be transformed into heat by the pressure relief valve(s).

According to the invention and by means of the adjustment of the conveying volume at the hydraulic pump, the available break moment at the drive engine can be used optimally at any time, as in the hydraulic fluid flow rate arriving at the hydraulic pump in general no variations are existent, due to non-existing dynamic pressures. If variations in the hydraulic fluid flow rate occur, these can be compensated via the adjustability of the displacement of the hydraulic pump by means of the control unit. For this, monitoring devices for monitoring the hydraulic fluid pressure, which are arranged at the drive mechanism of the hydraulic pump, can be designed even simpler, what likewise contributes to the simplification of the hydraulic pump.

As already explicated extensively above, according to the invention, the drag volume necessary for decelerating the hydrostatic transmission in coasting operation of the hydraulic pump is adjusted under consideration of the maximum drag rotational speed limit of the drive engine and/or of the hydraulic pump, as therewith the corresponding admissible rotational speed limit of one of the two components is not exceeded in coasting operation. During braking operation the more critical rotational speed limit should be reached or should be reached only nearly, as therewith the highest possible hydrostatic deceleration of the hydrostatic drive can be achieved, in particular, if the load on the hydraulic motor and therewith the hydraulic fluid flow rate towards the hydraulic pump is not constant. For example, the flow rate decreases continuously in the course of time from the beginning of the braking operation till its end (standstill) but the rotational speed of the drive engine, respectively of the hydraulic pump should be hold constant at the maximum admissionable rotational speed limit for the coasting mode.

The used pressure relief valves are referenced according to the invention, preferably on the low pressure being present during the coasting operation at the inlet side of the hydraulic motor, i.e. they are referenced on the pressure downstream of the pressure relief valves in the connection line. In another embodiment of the invention the pressure relief valves can be referenced on different pressures acting also, like the aforementioned low pressure at the inlet side, closing on the pressure relief valves.

In a further embodiment of the inventive arrangement the limit pressure, at which excess the pressure relief valves open, is given by a pressure relief valve spring, which further preferably is adjustable. In a further embodiment the spring force of the pressure relief valve spring is adjustable once when putting into service the hydrostatic transmission, whereby a fixed given maximum pressure is set for the coasting operation.

In another preferred embodiment the force with which the pressure relief valve is maintained closed is preferably adjustable also during the operation of the hydrostatic drive by means of an actuator. The adjustment of the pressure limit can be done further preferably also by a control unit and depending on the rotational speed of the hydraulic pump arranged in the closed hydraulic circuit and/or in dependency on the rotational speed of the drive engine on which the hydraulic pump supports itself in coasting operation. With such a rotational speed depending setting of the closing forces on the corresponding pressure relief valve, also the connectable and detachable power consumers, in particular auxiliary power consumptions can be considered, as well as further drives, for instance auxiliary drives of the working machines, which during the coasting operation consume power and reduce the rotational speed of the drive motor, respectively of the hydraulic pump. Therewith the opening pressure of the pressure relief valves, at which excess a partial flow rate of the hydraulic fluid is released over the connection line, can be adjusted such that the drive engine, respectively the hydraulic pump driven by the drive engine can turn constantly during the coasting operation at or nearly at the maximum admissible rotational speed limit. The adjustment of the opening pressure is done preferably by the control unit in cooperation with the adjustment of the drag volume respectively of the conveying volume of the hydraulic pump, for instance by an actuator being controllable by a control unit. The actuator adapts mechanically, electrically, pneumatically or hydraulically the opening pressure of the pressure relief valve corresponding to the control signal of the control unit. Imaginable is also a manual actuation, for instance by an operator.

Via the adjustability of the opening pressure of the pressure relief valves an eventual standstill, exemplarily of the traction wheels of a working machine, can be prevented if the friction between the wheels and the pavement is not sufficient to bring the hydrostatic drive in the coasting mode or to hold the same in that operational mode. Especially, with single wheel motor-drives the brake power can be adapted to the individual operation conditions at one single traction wheel or at the drive shaft, in order to improve the drive stability respectively the break stability.

In closed hydraulic circuits for hydrostatic drives pressure relief valves are used—in particular also according to the invention—to prevent damage to the working machine. The hydraulic fluid necessary for controlling the pressure relief valves in form of a pilot volume flow is conducted to a tank when opening a pressure relief valve and is lost for the working circuit for performing work. Additionally, hydraulic fluid gets lost in closed hydraulic fluid circuits over leakages, in particular in driving mechanisms. In order to return these generally low amounts of hydraulic fluid again to the working circuit, commonly, in hydrostatic transmissions with closed hydraulic fluid circuit, a charge pump is provided for compensating the loss of hydraulic fluid.

The charge pump charges via a charge line hydraulic fluid into the low pressure line of the hydrostatic transmission if necessary. Therefore charge pumps are used commonly are usually mechanically connected to the transmission pump or to the main hydraulic pump, and run usually permanently with the same. As the connection line of the inventive hydrostatic transmission is fluidly connected in coasting operation with the low pressure of the inlet-side of the hydraulic motor, a charge pressure line can be connected directly to the low pressure part of the connection line, without going beyond the commonly known necessary components for charging hydraulic fluid with charge pressure into a closed hydraulic circuit. Such a connection of the charge line to the connection line is especially preferred in reversible hydrostatic transmissions according to the invention. Commonly, for each working line a feeding line of a charge circuit with an extra check valve had to be arranged for filling the closed hydraulic circuit. According to the invention these check valves are already arranged in the connection line for hydraulic motors, which are operatable in both directions and, preferably, arranged directly in or at the hydraulic motor. Thus, only one single charge pressure line is sufficient to be connected directly between the two check valves in the connection line connecting the outlet and the inlet of the drive mechanism of the hydraulic motor.

The inventive method for decelerating a hydrostatic transmission in coasting operation controls the displacement of the hydraulic pump such that neither a rotational speed limit of the hydraulic pump nor a rotational speed limit of a drive engine driving the hydraulic pump (maximum admissible drag rotational speed) is exceeded. As the conveying volume of the driving mechanism of the hydraulic motor is changed according to the amount of the necessary deceleration performance, the conveying volume flow rate, which is guided to the hydraulic pump is limited via the pressure relief valves to a constant maximum value, whereby the whole deceleration capacity of the hydrostatic transmission can be used in an optimal manner during a coasting operation at the maximum admissible (drive engine-)rotational speed limit. If the hydraulic power being generated by the drive mechanism of the hydraulic motor in coasting operation is higher than the hydraulic power, which can be delivered in a hydrostatic transmission to the hydraulic pump a partial flow rate of the hydraulic fluid flow rate conveyed by the hydraulic motor under high pressure is released, according to the invention, to a low pressure corresponding to the inlet side by opening a connection line arranged between the outlet and the inlet of the hydrostatic transmission. Thereby the high pressure at the outlet side exceeds a pressure limit, respective an opening pressure of a pressure relief valve arranged in the connection line.

During the operation of a working machine variable coasting modes can occur such that the hydraulic flow rate guided to the hydraulic pump is preferably adjustable during the coasting operation. According to the invention the adjustability of the hydraulic fluid flow rate is referenced to the rotational speed of the drive engine, respectively to the rotational speed of the hydraulic pump in the hydrostatic transmission such that the rotational speeds limits of both units will not be exceeded. However, at the same time, the unit with the lower rotational speed limit will be held on its maximal admissible drag rotational speed. Preferably, the inventive method holds the drive engine just below its maximum admissible rotational speed limit for the drag operation or the coasting operation, such that the rotational speed, respectively the occurring kinetic forces on the working machine do not exceed the maximum admissible rotational speed limit. Therefore, one can imagine for example a coasting rotational speed limit for the drive engine respectively the hydraulic pump in a range of approx. 5 to 15 percent below their maximum admissible rotational speed limits for the coasting operation, depending which unit shows the lower limiting rotational speed.

With the invention an improved device and an efficient method for decelerating a hydrostatic transmission is provided, with which a maximum hydrostatic deceleration can be obtained in a sensible manner without big control efforts and in a reliable and, at the same time, robust way. Thereby, in comparison to the state of the art, less excessive kinetic energy of the hydrostatic transmission, which cannot be supported by the drive engine, have to be transformed into heat by the means of pressure relief valves. If applicable, mechanical brake systems are charged less, what is leading to lower wear at these parts.

BRIEF DESCRIPTION OF THE DRAWINGS

In the following preferred embodiments of the inventive hydraulic motor are shown exemplarily with the help of Figures without limiting the inventive idea to these embodiments. It is shown.

DETAILED DESCRIPTION

Figure 1:
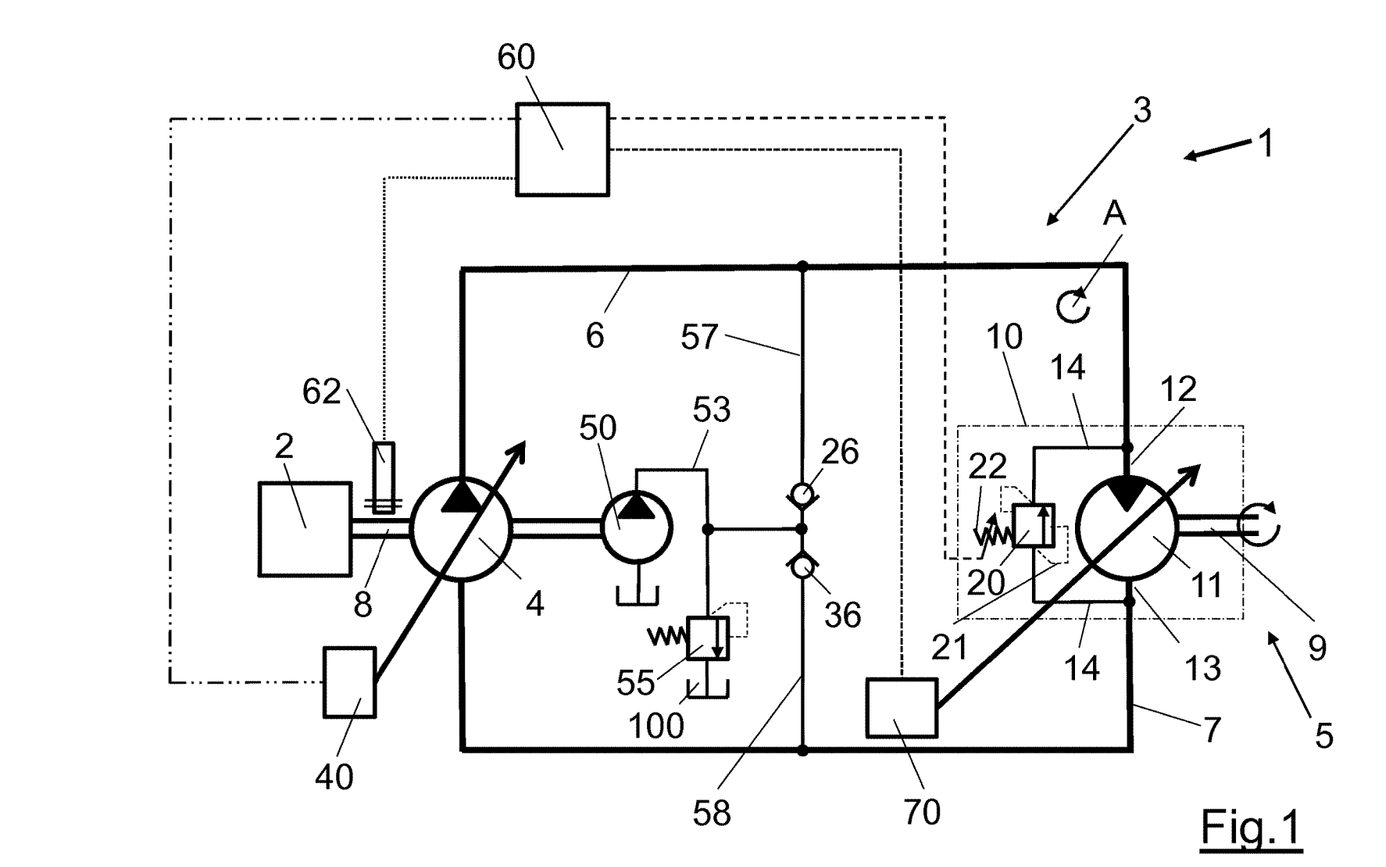
FIG. 1 is a first embodiment of an inventive hydrostatic transmission with a closed hydraulic fluid circuit.

FIG. 1 shows schematically in a simplified illustration a working machine 1, which is drivable by a drive engine 2. Drive engine 2 drives a hydraulic pump 4, with which a charge pump 50 is mechanically connected. Hydraulic pump 4 is hydraulically connected to a hydraulic motor 5 with two working lines 6 and 7 such that hydraulic pump 4 and hydraulic motor 5 are operated together in a closed hydrostatic hydraulic fluid circuit. For simplification of the description of the invention, for the hydrostatic transmission 3 shown in FIG. 1 it is assumed that the conveying direction, i.e. the through flow direction through the hydraulic working lines 6 and 7 is clockwise. This is indicated schematically in FIG. 1 with arrow A.

In propel operation of working machine 1 hydraulic pump 4 conveys hydraulic fluid under high pressure over hydraulic line 6 to hydraulic motor 5, which hydraulic motor 5 releases high pressure by providing rotational energy and conveying the same under low pressure over the hydraulic line 7 back to hydraulic pump 4. In the embodiment shown in FIG. 1 hydraulic pump 4 as well as hydraulic motor 5 are operable only in one conveying direction, whereby their conveying volume, respectively drag volume is adjustable. Exemplarily, hydraulic motor 5 in FIG. 1 turns clockwise. If the hydrostatic transmission is in the operational propel condition hydraulic line 6 is a high pressure line and hydraulic line 7 is a low pressure line for connecting both hydrostatic drive mechanisms. In a coasting operation, in which hydraulic motor 5 is driven by its drive shaft 9, hydraulic motor 5 acts as a pump and conveys hydraulic fluid under high pressure over hydraulic line 7 to hydraulic pump 4. Thereby hydraulic motor 5 sucks in hydraulic fluid coming from the hydraulic pump 4, as hydraulic line 6 is a low pressure line in the coasting operation.

Depending on the amount of deceleration performance which should be supported in the coasting operation via the hydraulic transmission 3, hydraulic motor 5, respectively the drive mechanism 11 arranged within hydraulic motor 5, is adjusted in its displacement. For this, it is valid in general that the deceleration moment at drive mechanism 11 is the bigger the higher its displacement is set. Thereby, the hydraulic performance results from the displacement of the drive mechanism 11 and the rotational speed of the same. This power can be forwarded completely to hydraulic pump 4 respectively to the drive mechanism of hydraulic pump 4 via outlet 13 of the drive mechanism 11 only if the deceleration power does not overload the drive engine 2 or hydraulic pump 4. If the required brake performance is higher as the power which can be supported by means of the hydraulic pump 4 on drive engine 2, the excessive power have to be transformed by means of pressure relief valves 20 into heat, in order that hydraulic pump 4 and/or drive engine 2 are not overspeeded.

In the coasting operation, e.g. in a downhill drive of the working machine 1, kinetic energy is preferably supported against the drive engine 2 of the working machine. However, drive engine 2 as well as the mechanically connected hydraulic pump 4 show rotational speed limits, which should not be exceeded. With respect to drive engine 2 one speaks hereby of a maximum admissible coasting rotational speed, with which the drive engine may be driven maximally in a forced way by means of its driving shaft. Similarly, a hydraulic pump also shows a rotational speed limit, which should also not be exceeded in order to prevent damage. With the adjusted conveying volume at the hydraulic pump—which in this case is a drag volume—and the given rotational speed limit it follows a maximum mechanical power being supportable on the driving components of a working maschine. This power must not be sufficient in a coasting operation, in order to decelerate the working machine only by the so called motor brake power and without damaging the driving units. Excessive kinetic energy, i.e. the part of the kinetic energy, which exceeds the mechanical supportable brake power at the drive motor, can be released via pressure relief valves in form of heat and/or via other known (mechanical) brake systems.

Preferably, for the transformation of kinetic energy into heat the invention provides a kind of bypass line for drive mechanism 11 as connection line 14 running from outlet 13 of drive mechanism 11 to inlet 12 of drive mechanism 11 having a pressure relief valve 20 arranged in this connection line 14. Pressure relief valve 20 opens if the pressure in connection line 14 upstream, i.e. before the pressure relief valve 20 present at outlet 13 of drive mechanism 11 exceeds a predetermined pressure limit. For this, in one embodiment of pressure relief valve 20 a pilot line 21 is foreseen, which guides the pressure in connecting line 14 to a valve spool such that the resulting hydraulic force acts pressure relief valve-opening against a force, e.g. of a valve spring 22, which acts valve-closing. By means of the preferably adjustable closing force on pressure relief valve 20 the limit pressure, respectively the opening pressure, at which the pressure relief valve opens is predeterminable, respectively adjustable or changeable. Further, additionally to the valve-closing acting valve spring 22 pressure relief valve 20 is referenced preferably to the low pressure being present at inlet 12 of drive mechanism 11 or to a filling pressure present in a filling pressure line, respectively in a charged pressure line 53. The low pressure, respectively the charge pressure, also acts valve-closing such that pressure relief valve 20 is hold reliably in a closed position as long as the pressure difference between the high pressure and the respective reference pressure does not exceed a predetermined value.

For this, one can imagine that a force-adjustment of the pressure relief valve spring 22 is done only once when the working machine is put in operation or that a pressure relief valve spring 22 adjustment is possible depending on the operation conditions of the hydrostatic transmission. Such an adjustability of pressure relief valve spring 22 according to the operation conditions is imaginable in particular with varying drive shaft loads or wheel loads and if a traction force necessary for transmitting kinetic energy to the working machine on hydraulic motor is not sufficient to drive the hydraulic pump respectively the drive engine. In this case the opening pressure of the pressure relief valve 20 may be lowered in order to prevent a blocking of the drive wheels, for example. According to the invention this is preferably rotational speed-controlled by a control unit 60 which further preferably adjusts/reduces over an adjustment of the displacement of hydraulic pump 4 the rotational speed of drive engine 2 or that of hydraulic pump 4 with the aim to set a suitable costing rotational speed, which admits a deceleration of the hydrostatic transmission by means of supporting hydraulic pump 4 at the drive engine 2.

In particular, connection line 14 running from outlet 13 to inlet 12 of drive mechanism 11 is arranged within or in close proximity of housing 10 of hydraulic motor 5. Therewith, shorter ways for returning hydraulic fluid from a high pressure side to a low pressure side are achieved and, simultaneously, the arrangement of a low pressure accumulator is avoided. In the state of the art, frequently a low pressure accumulator as hydraulic fluid compensator is provided in order to prevent occurring low pressure drops on the low pressure side if high deceleration powers are requested. According to the invention excessive conveying power of drive mechanism 11 can be released over a connection line 14 and a pressure relief valve 20 arranged therein in form of heat power if a limit pressure is exceeded at outlet 13 of drive mechanism 11. Released hydraulic fluid can be returned via connection line 14 within or in closed proximity to the casing 10 of hydraulic motor 5 to inlet 12 of drive mechanism 11. Therewith, not only big line losses are prevented due to long hydraulic lines since also a compact and quick reacting and agile system is provided. Also dynamic pressures in the working lines, as they occur in the systems known from the state of the art, are prevented. The generated heat at the pressure relief valve 20 can be dissipated via suitable cooling devices to the environment, best known from the state of the art.

With this compact construction type for transforming hydraulic power directly into heat in/at hydraulic motor 5 a sensible control of the hydrostatic transmission is achieved, which shows short distances and therefore can react particularly quick to varying operation conditions. Furthermore, the inventive hydrostatic transmission is robust in its construction type, as exposed lines, connections and valves are generally prevented.

Figure 2:
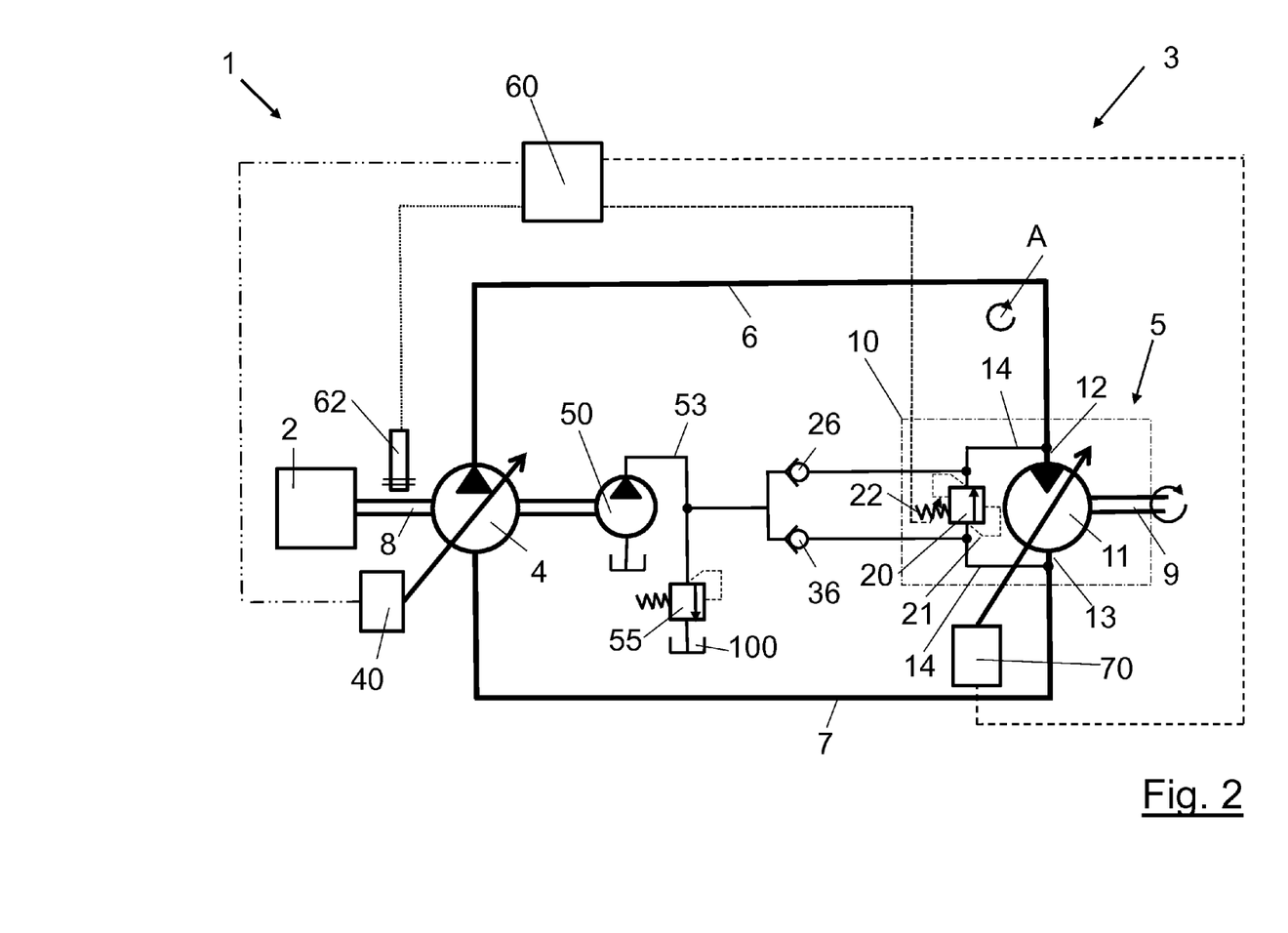
FIG. 2 is the embodiment of FIG. 1 in a further preferred embodiment.

In FIG. 2 in a further preferred embodiment of a short connection between outlet 13 and inlet 12 of drive mechanism 11 of the hydraulic motor 5, a charge line 53 is shown, with which charge line 53 hydraulic fluid under charge pressure for filling up the closed circuit can be provided and which can be connected to connection line 14 either downstream after as well as upstream before the pressure relief valve 20. Between the charge pressure line 53 and the connection line 14 on both sides of pressure relief valve 20 a check valves 26, 36 on each side has to be arranged in order that the pressure present in the connection line 14 does not repulse into charge pressure line 53—in case the pressure in connection line 14 is higher than the charge pressure. By connecting charge pressure line 53 to connection line 14 the closed hydraulic fluid circuit of hydrostatic transmission 3 can be filled directly at hydraulic motor 5, whereby another security against an undesired underpressure at the low pressure side (low pressure drop) is achieved. For this, the charge pressure is preferably provided by a charge pump 50, which further preferably is connected mechanically to hydraulic pump 4 and/or mechanically connected to drive engine 2. If the charge pressure in the coasting operation is higher than the pressure in connection line 14 the closed circuit of hydraulic transmission 3 can be filled at inlet 12 of drive mechanism 11 via check valve 26. An eventual lack of hydraulic fluid on the low pressure side, when supporting the hydrostatic transmission 3 in coasting operation, can thus be prevented effectively. Herewith as well a hydraulic fluid pressure accumulator for feeding hydraulic fluid into the low pressure side in a coasting operation can be avoided in a reliable manner.

Figure 3:
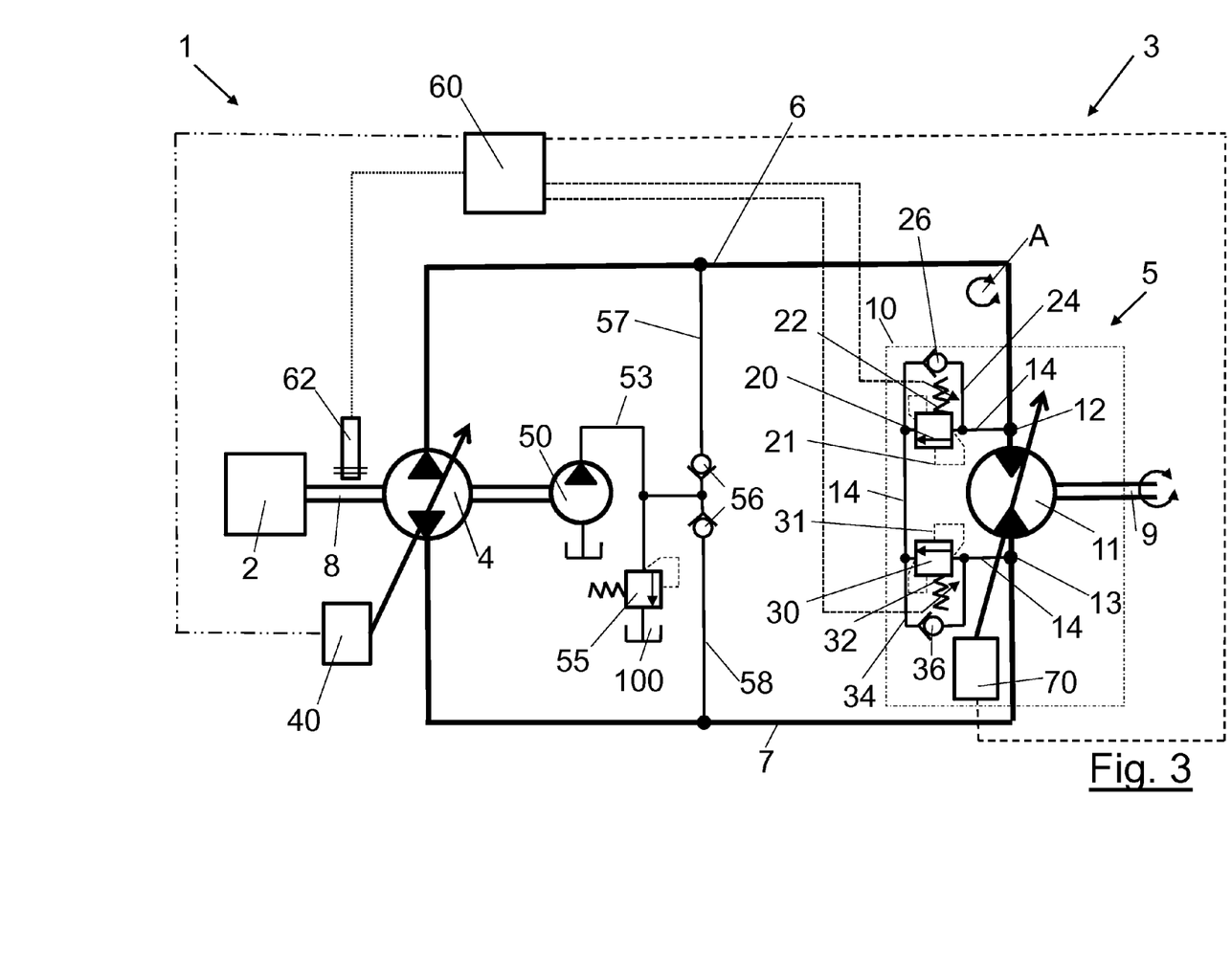
FIG. 3 is a further embodiment of an inventive hydrostatic transmission with a closed hydraulic fluid circuit.

In the illustration of FIG. 3 the inventive idea is shown with the help of a hydrostatic transmission 3 being adjustable operable in both conveying directions. By this a traction drive in which a hydrostatic transmission is used, can be driven forward as well as backwards. In order that the inventive idea can be used also for these systems, two pressure relief valves 20, 30 are arranged in connection line 14 between inlet 12 and outlet 13 of drive mechanism 11, each of which for each operation direction. As the drive mechanism of hydraulic pump 4 can be operated in both rotational directions, for a person with skills in the art it is obvious that with changing the conveying direction also inlet 12 and outlet 13 of drive mechanism 11 of hydraulic motor 5 are changing, corresponding to the conveying direction. Each of pressure relief valves 20, 30 arranged within connection line 14 however show only one direction of through flow which correspondingly is directed from the respective outlet 13 to the respective inlet 12. This means, that each pressure relief valve 20 or 30 can be used in coasting operation in one direction of flow, exemplarily for the forward operation or the reverse operation in order to transform hydraulic power into heat. Thereby, the two pressure relief valves through flow directions are oriented such that the two through flow directions are directed towards to each other such that connection line 14 can be opened alternatively by one of the two pressure relief valves 20 or 30, respectively can be blocked by the corresponding other pressure relief valve 20 or 30. In order that according to the invention a pressure reduction, respectively a transformation of hydrostatic power into heat over connection line 14 is possible, to each of the two pressure relief valves 20, respectively 30, a bypassing bypass line 24, respectively 34 is allocated. Further, in each of both bypass lines 24 and 34 a check valve 26, respectively 36, is arranged, which opens opposite to the through flow direction of the pressure relief valve, to which it is allocated. Therewith, for each through flow direction one pressure relief valve 20, respectively 30, opens and simultaneously one check valve 36, respectively 26. Therewith, once more a preferably short connection between the outlet and the inlet of drive mechanism 11 is given. The corresponding other through flow direction through connection line 14 is blocked by one of both pressure relief valves 30 or 20 and simultaneously by one of the two check valves 26 or 36.

Via a charge pressure line 53 being fed by a charge pump 50 the closed hydraulic circuit can be filled with hydraulic fluid either via a filling pressure line 57 and working line 6 or via a filling pressure line 58 and working line 7, depending on which of the two working lines 6 or 7 is the low pressure working line. In order to prevent that the hydraulic fluid under pressure repulses from one of the two working lines 6 or 7 into charge pressure line 53 the filling pressure line 57 as well as the filling pressure line 58 comprise each a correspondingly arranged check valve 56.

Figure 4:
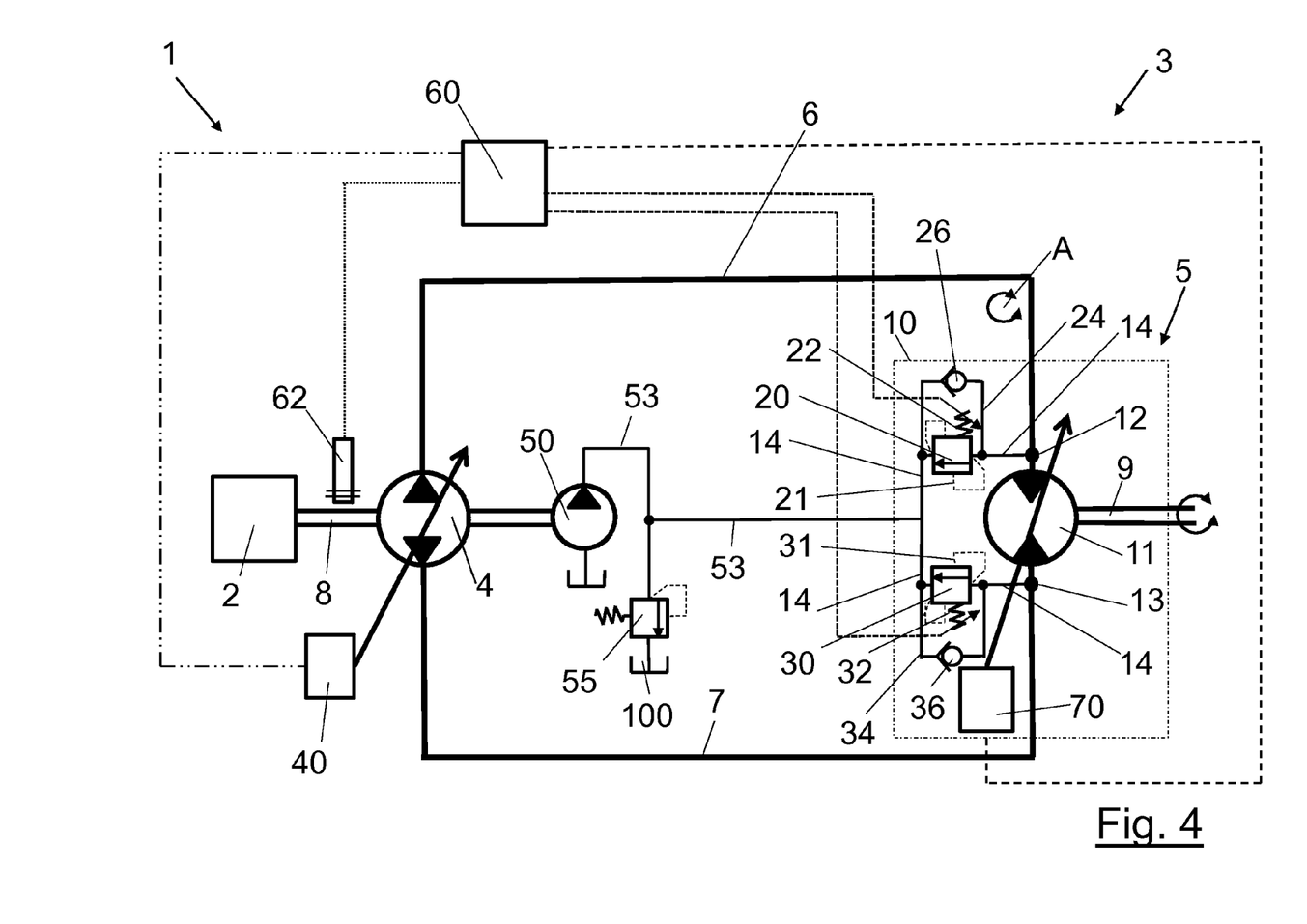
FIG. 4 is the embodiment of FIG. 3 in a further preferred embodiment.

In a further embodiment of the hydrostatic transmission of FIG. 3, a charge pressure line 53 can be connected directly between the two bypass-check valves 26 and 36 to connection line 14, without the necessity of the check valves 56 shown in FIG. 3. This is shown in the embodiment according to FIG. 4. In particular, by doing this, a separate connection of charge pressure line 53 to one of the two hydraulic lines 6 and 7 can be omitted, as drive mechanism 11 is chargeable over connection line 14 and inlet 12 or outlet 13 with hydraulic fluid. In particular for compact units, e.g. for hydrostatic gear boxes such an arrangement saves a lot of construction space and leads to a more compact embodiment with a lower number of parts and lines.

With the inventive arrangement a short connection line between outlet 13 and inlet 12 of a driving mechanism 11 of a hydraulic motor 5 of for the deceleration of a hydrostatic transmission in a coasting operation is achieved. The displacement of hydraulic pump 4 is controlled such that neither a rotational speed limit of the hydraulic pump 4 nor a rotational speed limit (maximum admissible drag rotational speed) of drive engine 2 driving hydraulic pump 4 is adapted continuously. For the adjustment of the deceleration the conveying volume of hydraulic pump 4 is changed. A deviation of a partial flow rate of the hydraulic fluid flow rate conveyed by the hydraulic motor 5, respectively of drive mechanism 11 is enabled by means of opening the connection line 14 arranged between outlet 13 and inlet 12 of drive mechanism 11. Simultaneously, a transformation of kinetic energy into heat occurs when one of the two pressure relief valves 20 or 30 arranged in connection line 14 releases high pressure present at the outlet side to a low pressure level present at the inlet side. The at least one pressure relief valve 20 or 30 arranged in the connection line 14, however, opens only if the high pressure at the outlet side exceeds a predetermined pressure limit of the hydrostatic drive 3 (=opening pressure for pressure relief 20 or 30). As already explained above, the adjustment of the pressure limit can be done only once, preferably before putting into service of the working machine or otherwise preferred also during operation of the working machine, e.g. by a control device 60 according to the drive conditions of the hydrostatic drive. This is done, in particular, depending on the rotational speed of a driving shaft 8 of hydraulic pump 4, e.g. by means of a rotational sensor 62.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydrostatic transmission with a closed hydraulic fluid circuit, in which a hydraulic pump drivable by a drive engine and a hydraulic motor are arranged and connected fluidly through two working lines, whereas, alternately, depending on the operational mode and the conveying direction of the hydraulic pump, one working line is a low pressure line and the other working line is a high pressure line, and whereby the hydraulic pump as well as the hydraulic motor are adjustable in their respective displacement volumes by means of a control unit, and whereas the hydraulic motor comprises a housing containing a hydrostatic drive mechanism having an inlet and an outlet connected by a connecting line where a pressure control valve is arranged, which can be flown through in direction to the inlet and which pressure control valve opens if the high pressure present at the outlet exceeds a predetermined pressure limit of the pressure relief valve, wherein during coasting operation of the hydrostatic transmission the displacement volume of the hydraulic pump and/or of the hydraulic motor are adjustable by means of the control unit a function of the speed of the drive motor or of the speed of the hydraulic pump, whereby in the connecting line two pressure relief valves, each of which can be flown through only in one direction are arranged such that their flow directions are directed towards to each other, and whereby two bypass lines are provided, each for bypassing one of the two pressure relief valves and whereas in each bypass line one check valve is arranged opening opposite to the flow direction of the bypassed pressure relief valve, if the respective other, non-allocated pressure relief valve opens.

2. The hydrostatic transmission as claimed in claim 1, whereby the connecting line is arranged within or directly at the hydraulic motor.

3. The hydrostatic transmission as claimed in claim 1, whereby the pressure limit of the pressure relief valves is related to a filling pressure being present in a charge pressure line or is related to the pressure present in the connecting line on the inlet side.

4. The hydrostatic transmission as claimed in claim 1, whereby the pressure limit is adjustable by means of a pressure relief valve spring and/or by an actuator.

5. The hydrostatic transmission as claimed in claim 1, whereby the rotational speed of the drive motor and/or of the hydraulic pump is determinable by means of a rotational speed sensor arranged nearby the input shaft connecting mechanically the drive motor with the hydraulic pump.

6. The hydrostatic transmission as claimed in claim 1, whereby the pressure limit of one or both pressure relief valves is adjustable depending on the speed of the hydraulic motor.

7. The hydrostatic transmission as claimed in claim 1, whereby the closed hydraulic circuit can be filled by means of a charge pressure pump, which is connected fluidly to the connecting line.

8. The hydrostatic transmission as claimed in claim 1, whereby the charge pressure pump is connected to the connecting line between both pressure relief valves.

9. A method for decelerating a hydrostatic transmission as claimed in claim 1, whereby the hydrostatic transmission is in a coasting mode and whereby the displacement volume of a hydraulic pump is adjusted such that neither the rotational speed limit of the hydraulic pump nor the rotational speed limit of a drive engine which propulses the hydraulic pump is exceeded, whereas by means of the control unit the displacement volume of a hydraulic motor is adapted for adjusting the braking power and, at the same time, a partial flow of the hydraulic fluid volume flow rate is conducted via a connecting line running from an outlet to an inlet of the drive mechanism of the hydraulic motor, if the high pressure at the outlet of the drive mechanism is exceeding a predetermined pressure limit of a pressure relief valve arranged in connecting line, and whereas the high pressure is released by means of the pressure relief valve under dissipation of heat to a low pressure being present at the inlet of the drive mechanism.

10. The method according to claim 9, whereas the connection line is arranged within or directly at the hydraulic motor.

11. The method according to claim 9, whereas the pressure limit is adaptable during the coasting operation of the hydrostatic transmission.

12. The method according to claim 9, whereas, during coasting operation, the rotational speed of the drive engine or of the hydraulic pump is held in a range of 5% to 15% below the respective rotational speed limit, whichever is the lower rotational speed limit.

13. The hydrostatic transmission as claimed in claim 2, whereby the pressure limit of the pressure relief valves is related to a filling pressure being present in a charge pressure line or is related to the pressure present in the connecting line on the inlet side.

14. The hydrostatic transmission as claimed in claim 2, whereby the pressure limit is adjustable by means of a pressure relief valve spring and/or by an actuator.

15. The hydrostatic transmission as claimed in claim 3, whereby the pressure limit is adjustable by means of a pressure relief valve spring and/or by an actuator.

16. The method according to claim 11, wherein the pressure limit being adaptable during the coasting operation of the hydrostatic transmission is in dependency on the rotational speed of the hydraulic pump or of the drive engine propelling the hydraulic pump and/or in dependency on the conveying performance of the hydraulic motor.

17. A hydrostatic transmission with a closed hydraulic fluid circuit, in which a hydraulic pump drivable by a drive engine and a hydraulic motor are arranged and connected fluidly through two working lines, whereas, alternately, depending on the operational mode and the conveying direction of the hydraulic pump, one working line is a low pressure line and the other working line is a high pressure line, and whereby the hydraulic pump as well as the hydraulic motor are adjustable in their respective displacement volumes by means of a control unit, and whereas the hydraulic motor comprises a housing containing a hydrostatic drive mechanism having an inlet and an outlet connected by a connecting line where a pressure control valve is arranged, which can be flown through in direction to the inlet and which pressure control valve opens if the high pressure present at the outlet exceeds a predetermined pressure limit of the pressure relief valve, wherein during coasting operation of the hydrostatic transmission the displacement volume of the hydraulic pump and/or of the hydraulic motor are adjustable by means of the control unit a function of the speed of the drive motor or of the speed of the hydraulic pump, whereby the pressure limit of one or both pressure relief valves is adjustable depending on the speed of the hydraulic motor.

18. A hydrostatic transmission with a closed hydraulic fluid circuit, in which a hydraulic pump drivable by a drive engine and a hydraulic motor are arranged and connected fluidly through two working lines, whereas, alternately, depending on the operational mode and the conveying direction of the hydraulic pump, one working line is a low pressure line and the other working line is a high pressure line, and whereby the hydraulic pump as well as the hydraulic motor are adjustable in their respective displacement volumes by means of a control unit, and whereas the hydraulic motor comprises a housing containing a hydrostatic drive mechanism having an inlet and an outlet connected by a connecting line where a pressure control valve is arranged, which can be flown through in direction to the inlet and which pressure control valve opens if the high pressure present at the outlet exceeds a predetermined pressure limit of the pressure relief valve, wherein during coasting operation of the hydrostatic transmission the displacement volume of the hydraulic pump and/or of the hydraulic motor are adjustable by means of the control unit a function of the speed of the drive motor or of the speed of the hydraulic pump, whereby the closed hydraulic circuit can be filled by means of a charge pressure pump, which is connected fluidly to the connecting line.

19. A method for decelerating a hydrostatic transmission with a closed hydraulic fluid circuit, in which a hydraulic pump drivable by a drive engine and a hydraulic motor are arranged and connected fluidly through two working lines, whereas, alternately, depending on the operational mode and the conveying direction of the hydraulic pump, one working line is a low pressure line and the other working line is a high pressure line, and whereby the hydraulic pump as well as the hydraulic motor are adjustable in their respective displacement volumes by means of a control unit, and whereas the hydraulic motor comprises a housing containing a hydrostatic drive mechanism having an inlet and an outlet connected by a connecting line where a pressure control valve is arranged, which can be flown through in direction to the inlet and which pressure control valve opens if the high pressure present at the outlet exceeds a predetermined pressure limit of the pressure relief valve, wherein during coasting operation of the hydrostatic transmission the displacement volume of the hydraulic pump and/or of the hydraulic motor are adjustable by means of the control unit a function of the speed of the drive motor or of the speed of the hydraulic pump, whereby the hydrostatic transmission is in a coasting mode and whereby the displacement volume of a hydraulic pump is adjusted such that neither the rotational speed limit of the hydraulic pump nor the rotational speed limit of a drive engine which propulses the hydraulic pump is exceeded, whereas by means of the control unit the displacement volume of a hydraulic motor is adapted for adjusting the braking power and, at the same time, a partial flow of the hydraulic fluid volume flow rate is conducted via a connecting line running from an outlet to an inlet of the drive mechanism of the hydraulic motor, if the high pressure at the outlet of the drive mechanism is exceeding a predetermined pressure limit of a pressure relief valve arranged in connecting line, whereas the high pressure is released by means of the pressure relief valve under dissipation of heat to a low pressure being present at the inlet of the drive mechanism, and during coasting operation, the rotational speed of the drive engine or of the hydraulic pump is held in a range of 5% to 15% below the respective rotational speed limit, whichever is the lower rotational speed limit.

20. A method for decelerating a hydrostatic transmission with a closed hydraulic fluid circuit, in which a hydraulic pump drivable by a drive engine and a hydraulic motor are arranged and connected fluidly through two working lines, whereas, alternately, depending on the operational mode and the conveying direction of the hydraulic pump, one working line is a low pressure line and the other working line is a high pressure line, and whereby the hydraulic pump as well as the hydraulic motor are adjustable in their respective displacement volumes by means of a control unit, and whereas the hydraulic motor comprises a housing containing a hydrostatic drive mechanism having an inlet and an outlet connected by a connecting line where a pressure control valve is arranged, which can be flown through in direction to the inlet and which pressure control valve opens if the high pressure present at the outlet exceeds a predetermined pressure limit of the pressure relief valve, wherein during coasting operation of the hydrostatic transmission the displacement volume of the hydraulic pump and/or of the hydraulic motor are adjustable by means of the control unit a function of the speed of the drive motor or of the speed of the hydraulic pump, whereby the hydrostatic transmission is in a coasting mode and whereby the displacement volume of a hydraulic pump is adjusted such that neither the rotational speed limit of the hydraulic pump nor the rotational speed limit of a drive engine which propulses the hydraulic pump is exceeded, whereas by means of the control unit the displacement volume of a hydraulic motor is adapted for adjusting the braking power and, at the same time, a partial flow of the hydraulic fluid volume flow rate is conducted via a connecting line running from an outlet to an inlet of the drive mechanism of the hydraulic motor, if the high pressure at the outlet of the drive mechanism is exceeding a predetermined pressure limit of a pressure relief valve arranged in connecting line, whereas the high pressure is released by means of the pressure relief valve under dissipation of heat to a low pressure being present at the inlet of the drive mechanism, whereas the pressure limit is adaptable during the coasting operation of the hydrostatic transmission, and wherein the pressure limit being adaptable during the coasting operation of the hydrostatic transmission is in dependency on the rotational speed of the hydraulic pump or of the drive engine propelling the hydraulic pump and/or in dependency on the conveying performance of the hydraulic motor.

* * * * *